United States Patent Office 3,305,337
Patented Feb. 21, 1967

3,305,337
METHOD OF MANUFACTURE OF FLAT GLASS
ON MOLTEN TIN
David Gordon Loukes, Eccleston Park, Prescot, and John Graham Banner, Meols, Hoylake, England, assignors to Pilkington Brothers Limited, Liverpool, England, a corporation of Great Britain
No Drawing. Filed July 30, 1963, Ser. No. 298,599
8 Claims. (Cl. 65—65)

This invention relates to the manufacture of flat glass and in particular to the manufacture of flat glass in ribbon form.

It is a main object of the present invention to provide an improvement in the manufacture of flat glass during which glass is in contact with molten metal.

In the manufacture of flat glass during which glass is in contact with molten metal, according to the invention there is maintained in the molten metal at least a trace of an element with which an impurity in the molten metal preferentially reacts.

Further, in the manufacture of flat glass in ribbon form during which the glass is supported on a bath of molten metal, according to the invention, there is maintained in the bath at least a trace of an element with which an impurity in the bath preferentially reacts.

The trace element may be distributed through the whole of the bath, but from another aspect of the invention there is maintained in at least one region of the bath a trace of an element with which an impurity in the bath preferentially reacts.

The bath of molten metal is, for example, a bath of molten tin or a tin alloy having a specific gravity greater than glass and in which tin predominates, the bath being so constituted as to have all the characteristics fully described in U.S. Patent No. 2,911,759, the bath surface which is exposed at each edge of the ribbon being protected by maintaining in the headspace over the bath a plenum of protective atmosphere.

From this aspect the invention provides in the manufacture of flat glass in ribbon form during which the glass is supported on a bath of molten metal over which a plenum of protective atmosphere is maintained, additionally protecting the bath by maintaining in the bath at least a trace of an element with which an impurity in the bath preferentially reacts.

In fact the presence of the said element in the bath inhibits the formation of compounds of the molten metal of the bath so that according to another aspect, the present invention comprises in the manufacture of flat glass in ribbon form during which the glass is supported on a bath of molten metal, inhibiting the formation of compounds of the said molten metal by maintaining in at least a region of the bath at least a trace of an element with which an impurity in the bath preferentially reacts.

Bath metal is thought to migrate into the glass owing to the presence in the bath of oxygen and/or sulphur for example, which may gain access to the headspace over the bath or may enter the bath from the ribbon of glass, and the invention is preferably characterised by maintaining in the bath at least a trace of an element with which an impurity in the bath preferentially reacts, thereby controlling the migration of said metal into the underface of the ribbon as the ribbon is advanced along the bath.

Preferably the bath of molten metal on which the glass is supported is a bath of molten tin, and the presence of traces of an impurity, e.g. oxygen and/or sulphur in the tin, is thought to cause the migration of tin from the bath into the underface of the ribbon of glass.

The invention also comprehends controlling the migration of tin from the bath into the underface of the ribbon, by maintaining in the bath at least a trace of an element with which an impurity in the tin bath preferentially reacts.

Even though some tin may be incorporated in the underface of the ribbon the control of migration is such that the small amount of tin incorporated in the underface of the ribbon does not adversely affect the quality of the glass leaving the bath, for example the quality of glass which has flat parallel faces, and whose surfaces have a lustre of "fire finish" quality.

The element which is incorporated in the bath of molten tin may be added to molten tin as the molten tin is fed into the bath, in the form of a pure metal or an alloy of tin, and the element is one with which an impurity in the bath, for example oxygen and/or sulphur, reacts preferentially rather than with the tin of the bath. Accordingly the invention also comprises in the manufacture of flat glass in ribbon form during which the glass is supported on a bath of molten tin, inhibiting the formation of compounds of the molten tin by maintaining in the bath a sufficient level of at least one element selected from the group consisting of lithium, sodium, potassium, magnesium, calcium, barium, aluminium, indium, titanium, vanadium, chromium, manganese, iron, zinc, zirconium, niobium, carbon and silicon, thereby to control the migration of tin into the underface of the ribbon as the ribbon is advanced.

Magnesium is an eminently suitable element for incorporation into the tin to scavenge impurities from the tin, and from a further aspect the invention is characterised by continually incorporating magnesium in the bath in sufficient quantity for oxygen and sulphur in the bath to react preferentially with the magnesium, thereby controlling the migration of tin into the underface of the ribbon as the ribbon is advanced. Sodium is also a preferred additive metal.

An element other than sodium and magnesium which is soluble in the tin bath may be incorporated in the bath for example lithium, potassium, calcium, barium, aluminium, manganese, indium, iron or zinc. Also an element which is substantially insoluble in the tin bath at the working temperature of the bath may be employed, for example titanium, vanadium, chromium, niobium, zirconium or silicon in the form of a wire mesh or grid immersed in the bath, on which mesh or grid, the oxide and/or sulphide of the metal is formed. The grid may be removed periodically for cleaning. Carbon may also be used as a high melting point additive in the bath.

The quantity of additive element incorporated in the bath depends on the level of impurity which is dissolved in the molten bath, for example the amount of oxygen and sulphur gases which find their way into the plenum of protective atmosphere over the bath, and the amounts of oxygen and sulphur which enter the bath from the glass.

In the manufacture of flat glass in ribbon form according to the invention during which the glass is supported on a bath of molten tin, apparatus as described for example in U.S. Patent No. 2,911,759 may be employed, in which a bath of molten tin or tin alloy having a specific gravity greater than glass, is contained in a tank structure, and a plenum of a protective atmosphere is maintained in the headspace over the bath.

Sodium is preferably added to the bath in the form of a tin/sodium alloy, e.g. 5% sodium, 95% tin, in order to maintain in the bath an overall concentration of sodium of the order of 50 parts per million. Similarly magnesium may be added as a tin/magnesium alloy e.g.

5% magnesium, 95% tin in a sufficient quantity to maintain an overall concentration of magnesium of the order of 10 parts per million.

Alternatively the molten tin may be continuously extracted from the bath for recirculation back into the bath, and during this recirculation the additive element may be added to the tin. The addition of the scavenging element is effected in the whole length of the bath, or in a defined region or zone of the bath.

The concentration of sodium or magnesium in the tin bath is in excess of that required for reaction with oxygen and sulphur in the bath, so that the maintenance of this concentration of sodium or magnesium in the bath ensures that substantially all of the oxygen and sulphur dissolved in the bath reacts preferentially with the scavenging element rather than with tin, so that the oxygen and sulphur immediately become associated with the scavenging element in the bath, and migration of tin into the underface of the ribbon of glass is controlled.

The ribbon of glass taken from the bath may have a surface brightness at least equal to that obtained by "fire finish" treatment and the controlled presence in the bath of the additive element in no way impairs the surface quality of the glass.

Any additive element or compound of the additive element which may be volatilised from the exposed surface of the tin into the headspace over the bath is removed in the bath atmosphere so that the top surface of the ribbon of glass is not adversely affected.

Products of the reaction of impurities in the bath with the scavenging element may appear in the form of a dross of oxide for example which can be removed physically from the molten metal.

Control, according to the invention, of the migration into the underface of the ribbon of the bath metal, safeguards against possible side effects arising, for example, when the glass is subjected to heat treatment in the presence of oxygen.

The invention also comprehends flat glass produced by a method according to the invention in which the glass is supported on a bath of molten metal, characterised in that the surface concentration in the glass of the metal of the bath does not exceed a predetermined value.

In particular when employing a bath of molten tin, flat glass according to the invention produced on the molten tin bath is characterised in that the surface concentration of tin in the glass is so small as to be negligible.

The invention also comprehends a sheet of glass cut from flat glass of the kind having the above characteristics.

We claim:

1. In the manufacture of flat glass in ribbon form during which the glass is supported on a bath of molten tin, inhibiting the formation of compounds of the molten tin by maintaining in the bath at least one element selected from the group consisting of lithium, sodium, potassium, magnesium, calcium, barium, aluminium, indium, titanium, vanadium, chromium, manganese, iron, zinc, zirconium, niobium, carbon and silicon in sufficient quantity for oxygen and sulphur present as impurity in the bath to react preferentially with said element, thereby to control the migration of tin into the underface of the ribbon as the ribbon is advanced.

2. In the manufacture of flat glass in ribbon form having a polished surface during which the glass is supported on a bath of molten tin, continually incorporating magnesium in the bath in sufficient quantity for oxygen and sulphur in the bath to react preferentially with the magnesium, thereby controlling the migration of tin into the underface of the ribbon, as the ribbon is advanced.

3. In the manufacture of flat glass in ribbon form having a polished surface during which the glass is supported on a bath of molten tin, continually incorporating sodium in the bath in sufficient quantity for oxygen and sulphur in the bath to react preferentially with the sodium, thereby controlling the migration of tin into the underface of the ribbon, as the ribbon is advanced.

4. A method according to claim 1 including removing from the molten bath any reaction product of the trace element with an impurity in the molten tin.

5. Flat glass produced by a method according to claim 1, characterised in that the surface concentration of tin in the glass does not exceed a predetermined maximum value.

6. A method according to claim 1, wherein said element is maintained in a region of the bath.

7. In the manufacture of flat glass in ribbon form during which the glass is supported on a bath of molten tin, continually maintaining in the bath a trace concentration of an element with which oxygen and sulphur present in the bath as impurity react in preference to reaction with the tin, thereby inhibiting the formation of tin compounds in the bath.

8. A method according to claim 6, wherein said trace concentration of additive element in the bath of molten tin is in the range 10 to 50 parts per million.

References Cited by the Examiner

UNITED STATES PATENTS

| | | | |
|---|---|---|---|
| 2,754,559 | 7/1956 | Fromson. | |
| 2,911,759 | 11/1959 | Pilkington et al. | 65—65 |
| 3,218,141 | 11/1965 | Lambert | 65—65 |
| 3,218,143 | 11/1965 | De Lajarte | 65—65 |

S. LEON BASHORE, *Acting Primary Examiner.*

DONALL H. SYLVESTER, *Examiner.*

A. D. KELLOGG, *Assistant Examiner.*